United States Patent
Kuniyasu et al.

(10) Patent No.: US 9,581,105 B2
(45) Date of Patent: Feb. 28, 2017

(54) PISTON FOR INTERNAL COMBUSTION ENGINE AND MANUFACTURING METHOD THEREOF

(71) Applicant: AISIN SEIKI KABUSHIKI KAISHA, Kariya-shi, Aichi-ken (JP)

(72) Inventors: Atsushi Kuniyasu, Toyota (JP); Takuya Niimi, Handa (JP); Akihiro Okamoto, Nishio (JP); Ryo Okazaki, Kariya (JP); Takayuki Hayashi, Toyokawa (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/966,210

(22) Filed: Dec. 11, 2015

(65) Prior Publication Data

US 2016/0169151 A1 Jun. 16, 2016

(30) Foreign Application Priority Data

Dec. 12, 2014 (JP) ................................ 2014-251932

(51) Int. Cl.
| | | |
|---|---|---|
| *F01B 31/10* | (2006.01) | |
| *F02F 3/10* | (2006.01) | |
| *F02F 3/00* | (2006.01) | |
| *F16J 1/08* | (2006.01) | |

(52) U.S. Cl.
CPC ............. *F02F 3/10* (2013.01); *B23K 26/364* (2015.10); *F02F 3/00* (2013.01); *F16J 1/08* (2013.01); *B23K 2201/003* (2013.01)

(58) Field of Classification Search
CPC ..................... F16J 1/08; F16J 1/09; F02F 3/10
USPC ................................................... 92/158, 159
See application file for complete search history.

(56) References Cited

U.S. PATENT DOCUMENTS

| | | | | |
|---|---|---|---|---|
| 6,736,101 | B2 | 5/2004 | Kano et al. | |
| 7,171,936 | B2* | 2/2007 | Rein | F16J 1/02 123/193.4 |
| 8,069,773 | B2* | 12/2011 | Suzuki | F16J 1/04 92/158 |
| 8,430,020 | B2 | 4/2013 | Fujiwara et al. | |
| 8,794,208 | B2* | 8/2014 | Fiedler | F16J 1/08 92/223 |
| 2014/0170377 | A1* | 6/2014 | Hsu | F02F 1/20 428/141 |

FOREIGN PATENT DOCUMENTS

JP   2008-297928 A   12/2008

* cited by examiner

*Primary Examiner* — Michael Leslie
(74) *Attorney, Agent, or Firm* — Buchanan Ingersoll & Rooney PC

(57) ABSTRACT

A piston for an internal combustion engine includes a piston main body for the internal combustion engine, and a crosshatched groove being formed on a surface of the piston main body. The crosshatched groove includes a crosshatch angle that corresponds to a crossing angle of lines that configure a crosshatch, the crosshatch angle that is set at a range from equal to or greater than 15 degrees to equal to or less than 35 degrees.

9 Claims, 12 Drawing Sheets

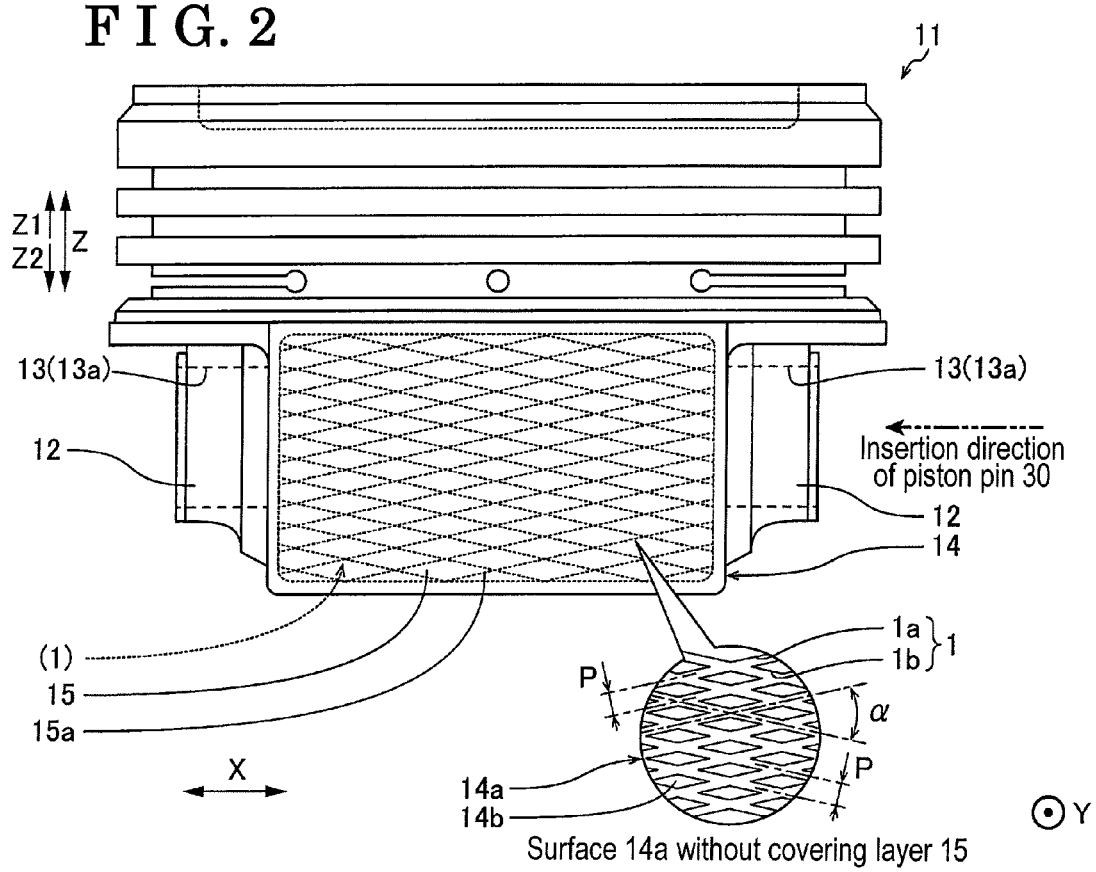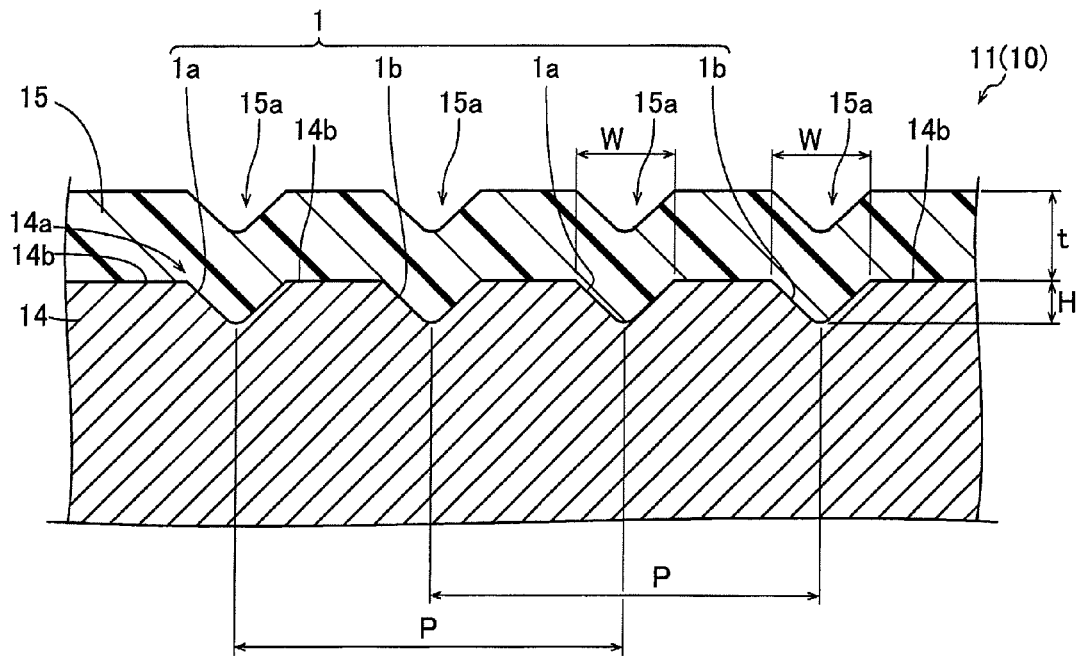

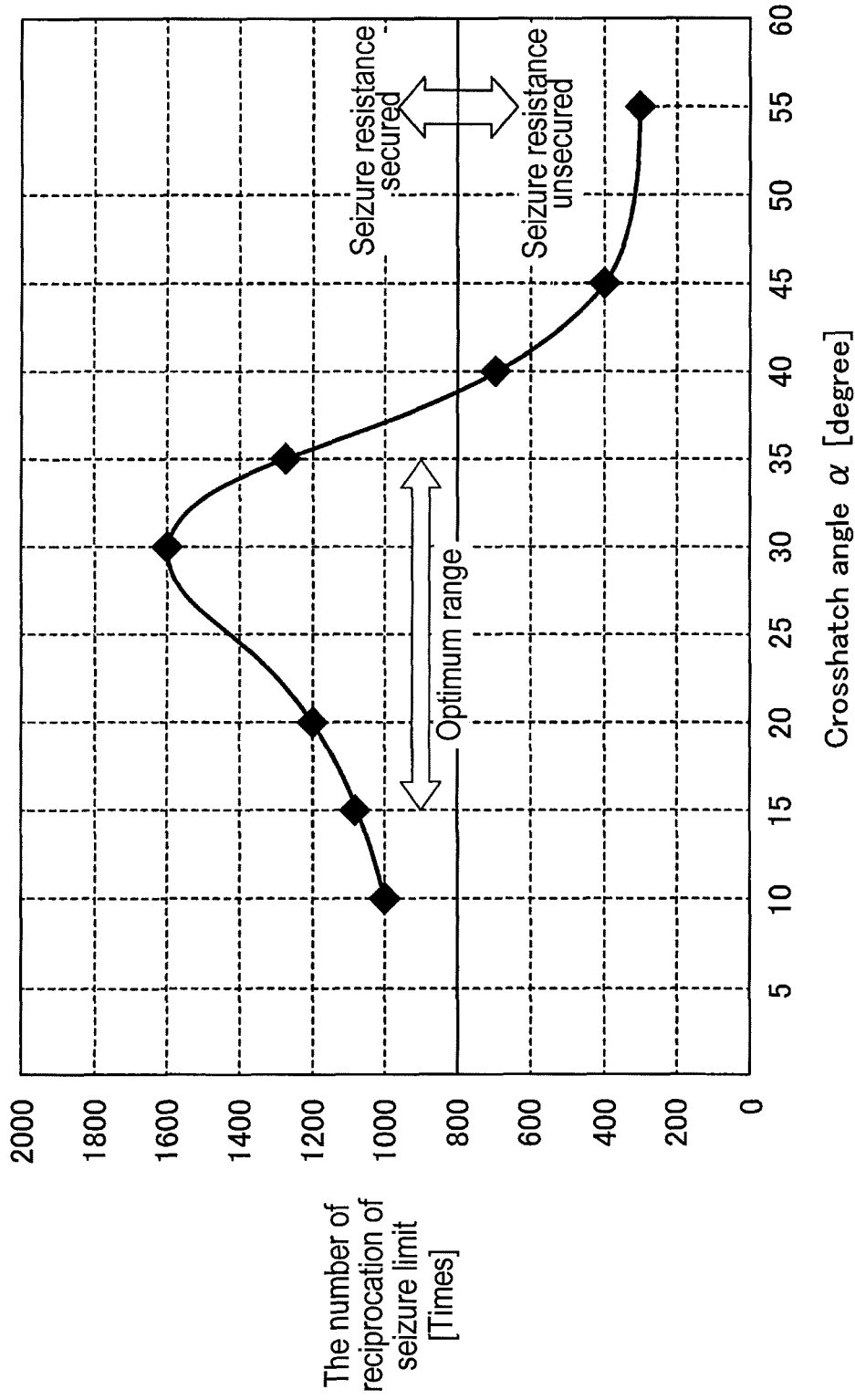
F I G. 12

PISTON FOR INTERNAL COMBUSTION ENGINE AND MANUFACTURING METHOD THEREOF

CROSS REFERENCE TO RELATED APPLICATIONS

This application is based on and claims priority under 35 U.S.C. §119 to Japanese Patent Application 2014-251932, filed on Dec. 12, 2014, the entire content of which is incorporated herein by reference.

TECHNICAL FIELD

This disclosure generally relates to a piston for an internal combustion engine and a manufacturing method thereof.

BACKGROUND DISCUSSION

A known piston for an internal combustion engine is disclosed in JP2008-297928A (hereinafter referred to as Patent reference 1). According to Patent reference 1, the piston of the internal combustion engine includes a skirt portion being provided at a piston main body, the skirt portion having plural streaks (stripe-shaped grooves) on a surface of the skirt portion formed by a cutting process using a cutting instrument, or by a form rolling process using a roller. According to the piston of the internal combustion engine, the plural streaks extend in parallel to each other in a sliding direction of the piston main body in a state where the plural streaks are inclined in only one direction by a predetermined angle.

However, according to the piston of the internal combustion engine disclosed in Patent reference 1, because the plural streaks are inclined and extend in the only one direction with respect to the sliding direction of the piston main body, a lubricant oil (oil) being positioned in the grooves is considered to be easily discharged from an edge of the groove by moving within the groove in accordance with a reciprocating motion of the piston. Thus, because the oil retaining performance at a sliding portion cannot be sufficiently ensured, the seizure resistance of the piston main body cannot be secured.

A need thus exists for a piston for an internal combustion engine and a manufacturing method thereof which is not susceptible to the drawback mentioned above.

SUMMARY

According to an aspect of this disclosure, a piston for an internal combustion engine includes a piston main body for the internal combustion engine, and a crosshatched groove being formed on a surface of the piston main body. The crosshatched groove includes a crosshatch angle that corresponds to a crossing angle of lines that configure a crosshatch, the crosshatch angle that is set at a range from equal to or greater than 15 degrees to equal to or less than 35 degrees.

According to another aspect of this disclosure, a manufacturing method of a piston for an internal combustion engine includes a forming process forming a crosshatched groove on a surface of a piston main body for the internal combustion engine by a laser processing, the crosshatched groove including a crosshatch angle that corresponds to a crossing angle of lines that configure a crosshatch, the crosshatch angle having a range from equal to or greater than 15 degrees to equal to or less than 35 degrees.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a view illustrating a piston main body (a skirt portion) according to the first embodiment;

FIG. 3 is a cross sectional view illustrating a surface structure of the skirt portion of the piston according to the first embodiment;

FIG. 12 is a graph illustrating a result of a first confirmation test examining an area of a crosshatch angle of a groove;

DETAILED DESCRIPTION

Embodiments of this disclosure will hereunder be explained with reference to the drawings.

A piston 10 of a first embodiment of this disclosure will be explained with reference to FIGS. 1 to 4.

Figure 1:
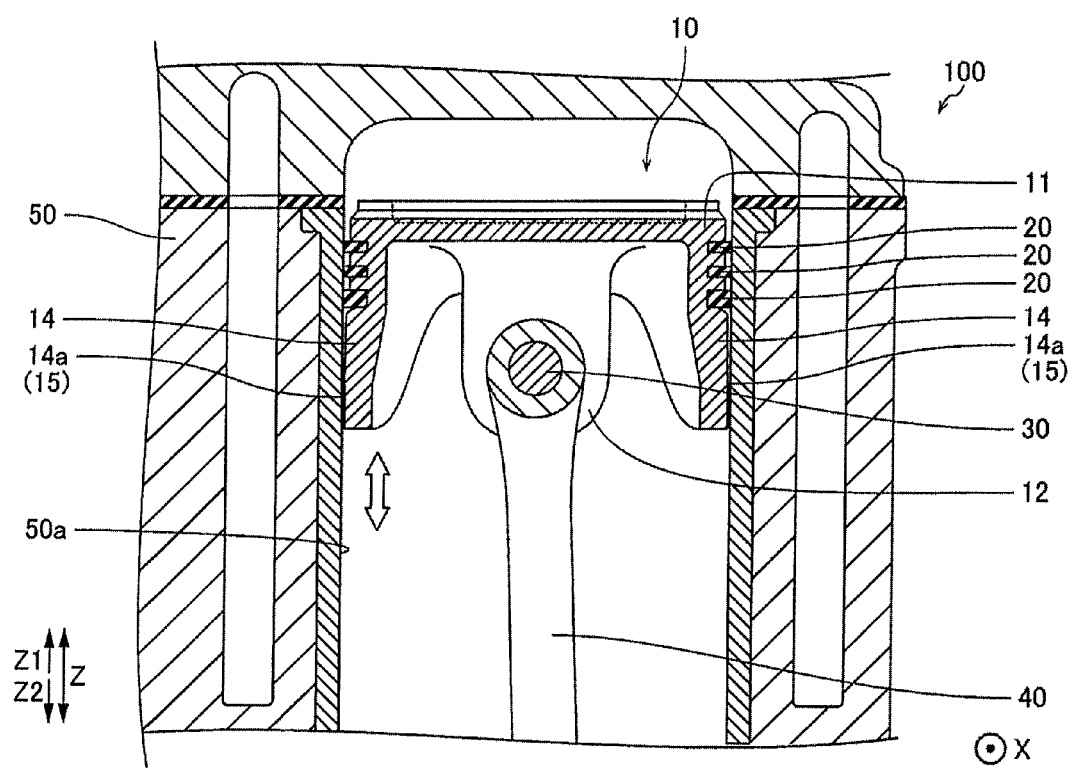
FIG. 1 is a cross sectional view illustrating a piston for an engine according to a first embodiment disclosed here.

The piston 10 of the first embodiment serves as a machine component used for an engine 100 (i.e., serving as an internal combustion engine) for an automobile. As shown in FIG. 1, the piston 10 includes a piston main body 11 and piston rings 20. The piston main body 11 includes a pair of boss portions 12 having respective piston pin holes 13 (see FIG. 2) and a skirt portion 14 (i.e., serving as a piston skirt portion). A piston pin 30 is inserted into the piston hole 13 of the boss portion 12 in a state where a first end of a connecting rod 40 is sandwiched by the pair of boss portions 12. A second end of the connecting rod 40 is connected to a crankshaft.

The pair of skirt portions 14 is provided in a Y direction orthogonal to a X direction within a lateral surface, the X direction in which the piston pin hole 13 extends. A surface 14a of the skirt portion 14 serves as a curved surface including a diameter slightly smaller than an inner diameter of a cylinder 50. A resin-made covering layer 15 (i.e., serving as a crosshatched covering layer) is provided on the surface 14a. In the engine 100, the covering layer 15 slides in a Z direction relative to an inner surface 50a of the cylinder 50 via an oil film in accordance with the reciprocating motion of the piston 10. The piston main body 11 is made of aluminum alloy. The covering layer 15 is made of thermosetting resin including heat resistance.

Here, according to the first embodiment, as shown in FIG. 2, the surface 14a of the skirt portion 14 is formed with a crosshatched groove 1. The groove 1 includes first plural grooves 1a extending in a first direction, and second plural grooves 1b extending in a second direction. The first groove 1a and the second groove 1b are crossed, or intersected with each other. A crosshatch angle α being formed by the first groove 1a and the second groove 1b that are crossed with each other is set at a range from equal to or greater than 15 degrees to equal to or less than 35 degrees with respect to the X direction (a lateral direction orthogonal to a sliding direction (the Z direction) of the skirt portion 14), the X direction corresponding to an insertion direction of the piston pin 30.

The first grooves 1a that extend in parallel to one another include a groove pitch P being set at equal to or greater than 40 micrometer, or 40 μm and equal to or less than 60 μm.

Similarly, the second grooves 1b that extend in parallel to one another include the groove pitch P being set at equal to or greater than 40 μm and equal to or less than 60 μm. As shown in FIG. 3, each of the first groove 1a and the second groove 1b includes a groove depth H that is set at equal to or greater than 4 μm and equal to or less than 8 μm. Each of the first groove 1a and the second groove 1b further includes a groove width W that is set at equal to or greater than 11 μm and equal to or less than 15 μm. A bottom portion of the groove 1 is formed in a curved shape instead of being bent to an acute angle.

The covering layer 15 covers the surface 14a in a state where the crosshatch pattern of the groove 1 is incorporated into the covering layer 15. Thus, the surface of the covering layer 15 includes recessed portions 15a that each includes the groove depth H being substantially same as the groove depth H of the groove 1 and the groove pitch P being substantially same as the groove pitch P of the groove 1. It is favorable that a thickness t of the covering layer 15 corresponds to less than twice the groove depth H. For example, in a state where the groove depth H is set at approximately 5 μm, the covering layer 15 includes the thickness t that is set at approximately 9 μm. A surface roughness Ra (roughness average) of a smooth surface 14b of the surface 14a of the skirt portion 14, the smooth surface 14b that does not include the groove 1, is set at equal to or less than 0.2 μm.

Figure 4:
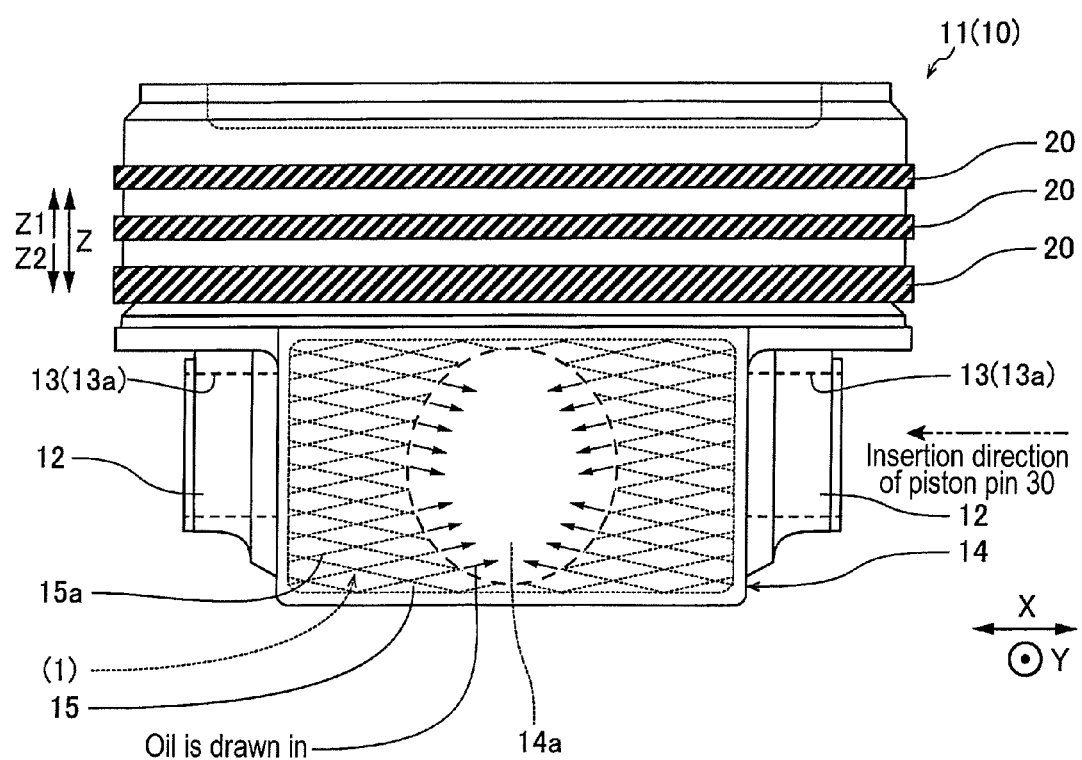
FIG. 4 is a view illustrating a state of a surface of the skirt portion after the piston is used according to the first embodiment.

After the piston 10 is mounted within the cylinder 50, the covering layer 15 slides relative to the inner surface 50a (see FIG. 1) of the cylinder 50 in accordance with a start-up of the engine 100. Accordingly, as shown in FIG. 4 that illustrates the piston main body 11 in a state where the piston main body 11 is used for a period of time, the covering layer 15 is partially worn out and the base surface 14a that corresponds to a substrate, or a base surface is exposed. Because the exposed surface 14a slides relative to the inner surface 50a, the groove depth H of the groove 1 comes to be shallow. However, an oil being retained at the crosshatched recessed portions 15a of the remaining covering layer 15 gradually flows to an area of the exposed surface 14a. Thus, because the oil is retained on the surface 14a having the groove depth H that comes to be shallow, the sliding resistance of the whole skirt portion 14 is maintained low. Accordingly, irrespective of the period of service of the engine 100, the oil retaining performance at the skirt portion 14 is maintained. As such, the piston 10 used for the engine 100 is configured.

Figure 5:
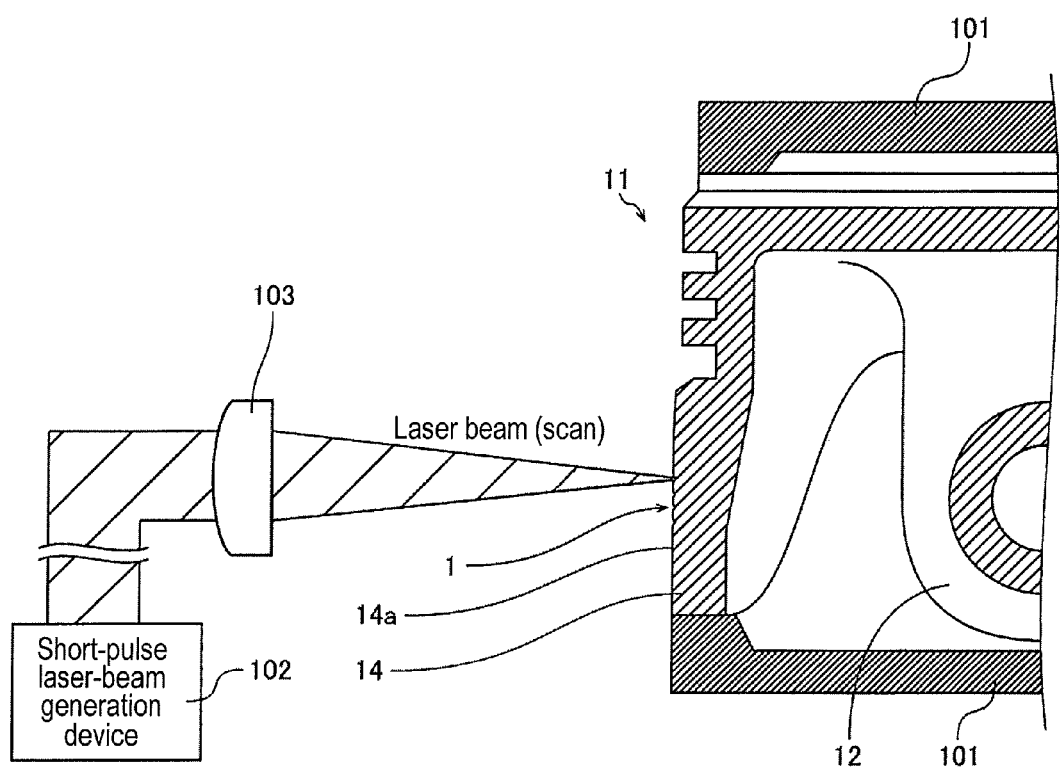
FIG. 5 is a view schematically illustrating a manufacturing method of the piston according to the first embodiment.

Next, a manufacturing method of the piston 10 will be explained with reference to FIGS. 3 and 5.

The piston main body 11 (see FIG. 5) that is made from a casting being made of aluminum alloy is manufactured by using a predetermined casting mold. The surface 14a of the skirt portion 14 (see FIG. 5) is polished to be changed to a mirror-finished surface so that the surface roughness Ra comes to be equal to or less than 0.2 μm. Then, as shown in FIG. 5, the piston main body 11 is set on a processing machine 101.

Here, according to the manufacturing process of the first embodiment, the crosshatched groove 1 (see FIG. 3) is provided on the surface 14a of the skirt portion 14 by using a short-pulse laser-beam generation device 102. Specifically, the short-pulse laser-beam generation device 102 intermittently irradiates a laser beam toward the surface 14a, the laser beam including the wavelength that is set at approximately 515 nanometer, or 515 nm, the pulse width that is set at approximately 10 picosecond, or 10 ps, the oscillatory frequency that is set at approximately 100 kilohertz, or 100 kH, and an irradiation energy that is set at approximately 9 microjoule per pulse, or 9 μJ/pulse. Further, an f θ lens 103 that includes a focal length f of 100 millimeter, or 100 mm is used. At the same time, an optical system is controlled so as to include a laser spot diameter of approximately 15.5 μm. In a state where the scan pitch is set at approximately 40 μm (the groove pitch P), a constant-velocity scan is operated.

Accordingly, the surface 14a on which the laser beam is irradiated includes the crosshatched groove 1 (see FIG. 3) including the groove pitch P that corresponds to approximately 40 μm, the groove depth H that corresponds to approximately 5 μm, and the groove width W that corresponds to approximately 12 μm. Because the fixed angle of the piston main body 11 relative to the processing machine 101 is controlled, the groove 1 includes the crosshatch angle α with the range from equal to or greater than 15 degrees to equal to or less than 35 degrees with respect to the direction orthogonal to the sliding direction (the Z direction) of the skirt portion 14. Because the optical system is controlled so that each of the groove pitch P and the groove depth H is set at a predetermined value (a predetermined range), approximately 12 μm of the groove width W serves as a value that is obtained from the result of the forming of the groove 1.

Then, as shown in FIG. 3, the covering layer 15 is formed on the surface 14a. At this time, the covering layer 15 is formed with the crosshatched recessed portions 15a into which the shape of the groove 1 is incorporated. As such, the piston 10 is manufactured.

According to the first embodiment, following effects and advantages may be attained.

According to the first embodiment, because the crosshatched groove 1 including the crosshatch angle α that is set at the range from equal to or greater than 15 degrees to equal to or less than 35 degrees is provided at the surface 14a of the skirt portion 14, the oil (a lubricant oil) is easily retained within the crosshatched grooves 1 that are intersected with each other. That is, unlike a case where each of the grooves 1 (the plural streaks) independently extends only in one direction, the groove 1 is formed with the crosshatched pattern, the oil supplied to the reciprocating piston main body 11 can be retained within the crosshatched groove 1 for a longer time, compared to a case where the crosshatched grooves independently extend in only one direction. As a result, because the oil retaining performance is sufficiently ensured at the skirt portion 14, the seizure resistance of the piston main body 11 can be secured.

According to the first embodiment, because the laser processing is used, the crosshatched groove 1 having the aforementioned crosshatch angle α, the groove pitch P, and the groove depth H is easily provided on the surface 14a of the skirt portion 14. That is, unlike a case where a short peening process (the SP process) is used to form protrusions and recessed portions at the surface 14a, a user does not have to clean fine particles (media) that are used for the SP process. Accordingly, the user does not have to mask a portion other than the area of the groove 1. Thus, the groove 1 including the oil retaining performance is easily formed by a simplified manufacturing process. Accordingly, the piston 10 securing the sufficient seizure resistance can be easily manufactured.

According to the first embodiment, the groove 1 is provided at the surface 14a within the range of the crosshatch angle α with respect to the lateral direction orthogonal to the sliding direction (the Z direction) of the skirt portion 14. Unlike a case where the groove 1 is inclined, or tilted in the sliding direction of the skirt portion 14, the oil supplied to the piston main body 11 is inhibited from moving within the groove 1 and from being discharged from the edge of the skirt portion 14 in a short time resulted from an inertia force of the reciprocating motion. As a result, because the oil retaining performance is performed at the skirt portion 14, the seizure resistance of the piston main body 11 is securely maintained.

According to the first embodiment, because the crosshatched groove 1 includes the groove pitch P that is set at equal to or greater than 40 μm and equal to or less than 60 μm, comparing to a case where the groove pitch P corresponds to less than 40 μm, the surface roughness of the piston main body 11 can be reduced. Comparing to a case where the groove pitch P is greater than 60 μm, the area of the smooth surface 14b that does not include the groove 1 can be inhibited from increasing excessively.

In a case where the groove depth H is set at less than 4 μm, the oil retaining performance is decreased because the surface roughness of the piston main body 11 is reduced excessively. According to the first embodiment, because the groove depth H of the crosshatched groove 1 is set at equal to or greater than 4 μm and equal to or less than 8 μm, the oil retaining performance is inhibited from being decreased. In a case where the groove depth H is greater than 8 μm, the surface roughness is increased excessively and the oil film can be easily broken at the smooth surface 14b. According to the embodiment, because the groove depth H of the crosshatched groove 1 is set at equal to or greater than 4 μm and equal to or less than 8 μm, the oil film can be inhibited from being broken at the smooth surface 14b. As a result, the smoothness of the surface 14a (the sliding portion) and the oil retaining performance can be appropriately maintained.

According to the first embodiment, because the covering layer 15 is provided so as to cover the surface 14a of the skirt portion 14, the recessed portion 15a of the covering layer 15 can retain the oil for a long time, the recessed portion 15a having the shape into which the crosshatched groove 1 is incorporated. Thus, because the covering layer 15 covers the skirt portion 14, the piston main body 11 is prevented from being seized and being worn out. In addition, because the oil retaining performance is sufficiently ensured at the covering layer 15 (the recessed portion 15a) having the shape into which the crosshatched groove 1 is incorporated, the abrasion of the piston main body 11 can be further reduced.

Next, a modified example of the first embodiment will be explained with reference to FIGS. 3 and 6. According to the modified example of the first embodiment, the skirt 14 is coated with a covering layer 16 (i.e., serving as a flat-surface covering layer) having a flat-surface shape.

Figure 6:
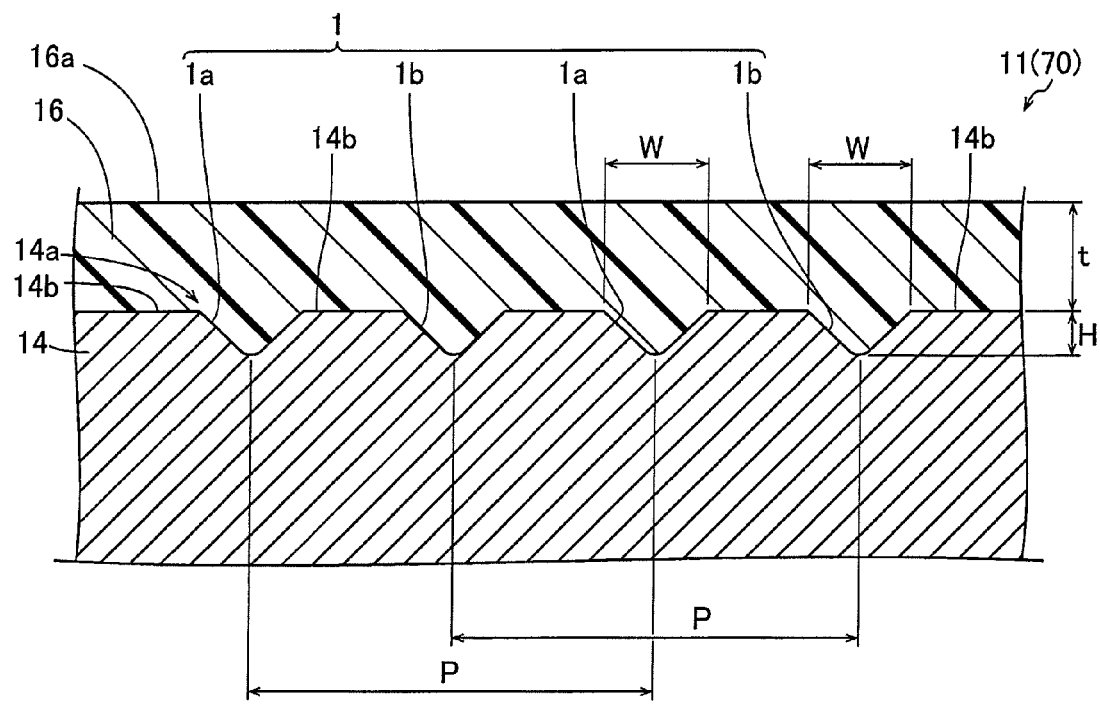
FIG. 6 is a cross sectional view illustrating a surface structure of a skirt portion according to a first modified example of the first embodiment.

That is, according to a piston 70 of the first modified example of the first embodiment, as shown in FIG. 6, the resin-made covering layer 16 is provided on the surface 14a of the skirt portion 14. The covering layer 16 is provided so as to be embedded in and cover the crosshatched groove 1 (the first groove 1a and the second groove 1b). An outermost surface 16a of the covering layer 16 is formed in the flat-surface shape instead of having a shape into which the crosshatched groove 1 is incorporated. In this case, the covering layer 16 is slightly thicker than the covering layer 15 (see FIG. 3). Other structures of the piston 70 are similar to, or are the same as the structure of the first embodiment.

According to the first modified example of the first embodiment, following effects and advantages may be attained.

According to the first modified example of the first embodiment, the covering layer 16 is provided so as to cover the surface 14a of the skirt portion 14. Because the covering layer 16 having the flat-surface outermost surface 16a covers the skirt portion 14, the piston main body 11 can be originally prevented from being seized and can originally obtain the effect for the reduction of the abrasion. Other effects of the first modified example of the first embodiment are similar to, or are the same as the effects of the first embodiment.

Next, a second modified example of the first embodiment will be explained with reference to FIG. 7. According to the second modified example of the first embodiment, a groove 111 being provided at the surface 14a of the skirt portion 14 is partially different from the groove 1 being provided at the surface 14a of the skirt portion 14.

Figure 7:
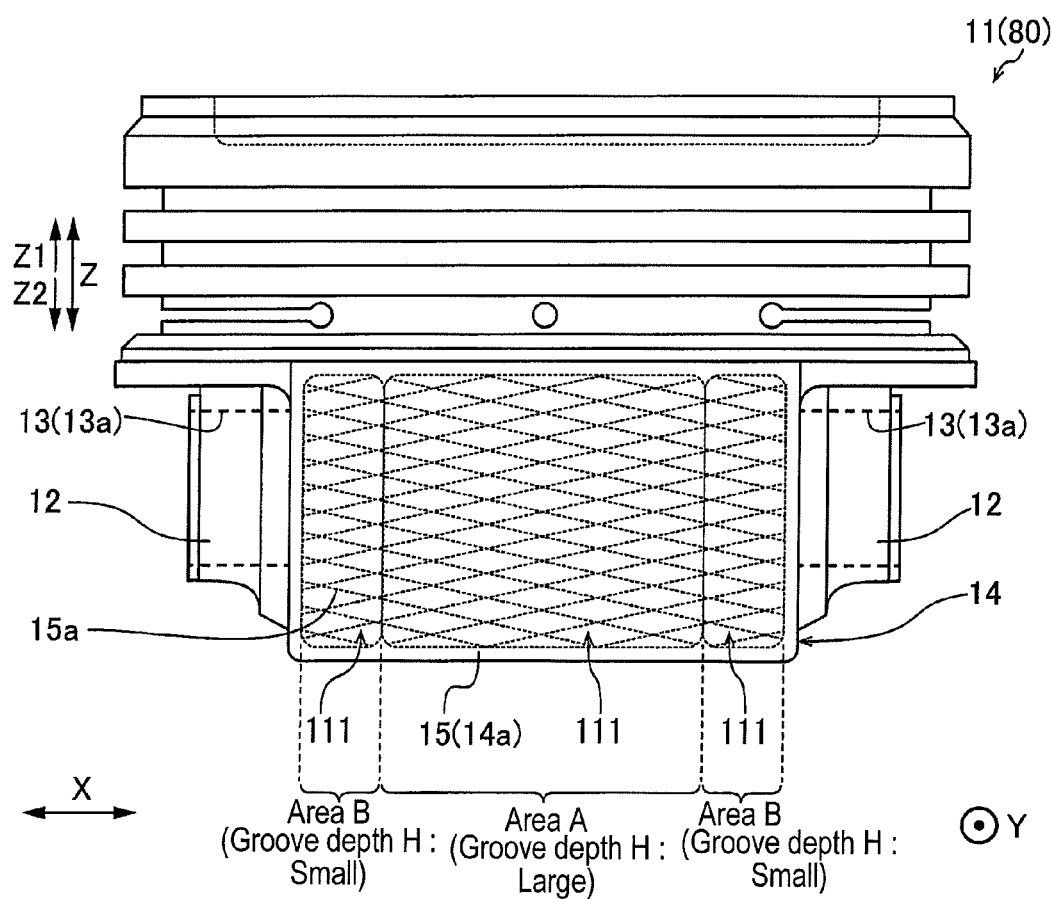
FIG. 7 is a view illustrating a piston main body according to a second modified example of the first embodiment.

That is, according to a piston 80 of the second modified example of the first embodiment, as shown in FIG. 7, an area A is positioned close to a center portion of the surface 14a of the skirt portion 14 and areas B are positioned next to opposing ends of the area A. The area A and the set of areas B are different from each other in terms of the groove pitch P and the groove depth H that are provided at each of the area A and the set of the areas B. In this case, the groove depth H of a grove 111 is positioned at the area A where the covering layer 15 is likely to be worn out by the sliding of the piston main body 111. The groove depth H of the groove 111 is positioned at the area B where the covering layer 15 is not relatively likely to be worn out. The groove depth H of the groove 111 being positioned at the area A is greater than the groove depth H of the groove 1 being positioned at the area B. The groove pitch P of the groove 111 that is positioned at the area A is smaller than the groove pitch P of the groove 111 that is positioned at the area B. Thus, the groove 111 of the area A is formed intensively relative to the groove 111 of the area B. The crosshatch angle α of the area A is similar the crosshatch angle α of the area B. Other structures of the piston 80 are similar to, or are the same as the structure of the first embodiment.

According to the second modified example of the first embodiment, following effects and advantages may be attained.

According to the second modified example of the first embodiment, the groove pitch P of the groove 111 that is positioned at the area A is relatively smaller than the groove pitch P of the area B. The groove depth H of the groove 111 that is positioned at the area A is relatively greater than the groove depth H of the area B. Accordingly, the greater amount of the groove 111 than the groove 1 of the first embodiment can be remained even if a wide range of the surface 14a of the skirt portion 14 is exposed by the abrasion of the covering layer 15 that is positioned at the area A in accordance with the reciprocating motion of the piston main body 11. Thus, the oil retaining performance is ensured at the skirt portion 14 (the recessed portion 15a and the exposed surface 14a that is positioned at the area A) for a longer time than the oil retaining performance of the first embodiment. Other effects of the second modified example of the first embodiment are similar to, or are the same as the effects of the first embodiment.

Next, a second embodiment will be explained with reference to FIGS. 2, 5 and 8. According to the second embodiment, in addition to the skirt portion 14, a crosshatched groove 2 is provided at an inner circumferential surface 13a of the piston pin hole 13.

Figure 8:
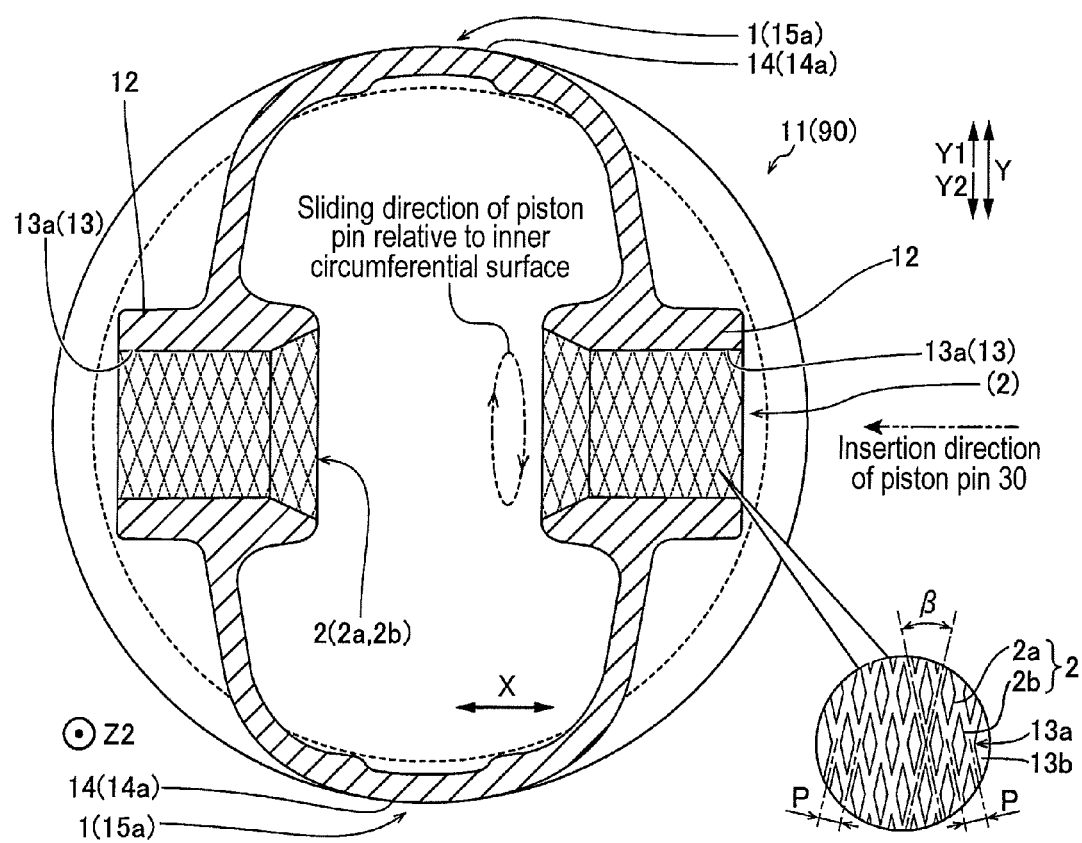
FIG. 8 is a cross sectional view illustrating a piston main body for an engine according to a second embodiment.

According to a piston 90 of the second embodiment, as shown in FIG. 8, the crosshatched groove 2 is provided at the inner circumferential surface 13a of the piston pin hole 13. The groove 2 includes plural first groove 2a extending in a first direction, and plural second groove 2b extending in a second direction. The first groove 2a and the second groove 2b are intersected, or crossed with each other. A crosshatch angle β being formed by the first groove 2a and the second groove 2b that are crossed with each other is set at the range from equal to or greater than 15 degrees to equal to or less than 35 degrees with respect to the sliding direction (a circumferential direction of the inner circumferential surface 13a) of the piston pin 30.

Here, the crosshatch angle α of the groove 1 of the first embodiment and the crosshatch angle β of the groove 2 of the second embodiment are set within the same range. However, the orientation of the crosshatch of the groove 1 is different from the orientation of the crosshatch of the groove 2. The reason of the setting of the groove 2 within the range from equal to or greater than 15 degrees to equal to or less than 35 degrees with respect to the sliding direction (the Y direction) of the inner circumferential surface 13a and the piston pin 30 will hereunder be explained.

The inner circumferential surface 13a of the piston pin hole 13 is likely to be torn outwardly in a radial direction in accordance with the use of the piston 90, that is, in accordance with the sliding of the inner circumferential surface 13a and of the piston pin 30. Such tear (the crack) is likely to be progressed along the inserted direction (the X direction) of the piston pin 30. In a case where the groove 2 includes the crosshatch angle β with respect to the insertion direction of the piston pin 30, the groove 2 increases the tear (crack) in a case where the tear (crack) is generated at the inner circumferential surface 13a in the X direction.

Because the orientation of the groove 2 is substantially along the sliding direction (the circumferential direction of the inner circumferential surface 13a) of the inner circumferential surface 13a relative to the piston pin 30, the piston pin hole 13 is inhibited from generating the tear (the crack) along the X direction. A smooth surface 13b (see FIG. 8) of the inner circumferential surface 13a that does not include the groove 2 includes the surface roughness Ra that is set equal to or less than 0.2 μm. The inner circumferential surface 13a being formed with the groove 2 does not include the covering layer 15.

The groove 2 (see FIG. 8) is formed by the irradiation of the short-pulse laser-beam by the short-pulse laser-beam device 102 (see FIG. 5) to the inner circumferential surface 13a of the piston pin hole 13. In this case, because the fixed angle of the piston main body 11 relative to the processing machine 101 (see FIG. 5) is controlled, the groove 2 is formed with the crosshatch angle β that is within the range from equal to or greater than 15 degrees to equal to or less than 35 degrees with respect to the sliding direction (the Y direction) of the inner circumferential surface 13a relative to the piston pin 30. Other structures of the second embodiment are similar to, or are the same as the structures of the first embodiment.

According to the second embodiment, following effects and advantages may be attained.

According to the second embodiment, because the crosshatched groove 2 includes the crosshatch angle β that is within the range from equal to or greater than 15 degrees to equal to or less than 35 degrees at the inner circumferential surface 13a of the piston pin hole 13, the oil supplied to the sliding portion of the piston pin 30 and of the inner circumferential surface 13a can be retained for a longer time than a case where the crosshatched groove 2 is not provided at the inner circumferential surface 13a. As a result, because the oil retaining performance is ensured at the piston pin hole 13, the seizure resistance between the piston pin 30 and the inner circumferential surface 13a can be secured.

According to the second embodiment, the groove 2 is provided at the inner circumferential surface 13a within the crosshatch angle β with respect to the sliding direction of the inner circumferential surface 13a relative to the piston pin 30. Thus, even in a case where the groove 2 is provided at the piston pin hole 13 that is likely to be torn outwardly in the radial direction, the tear (the crack) resulted from the groove 2 is inhibited from being increased, or enlarged in the X direction. Other effects and advantages of the second embodiment are similar to, or are the same as the effects and the advantages of the first embodiment.

Next, the confirmation test (embodiment) being operated to confirm the aforementioned effects of the embodiment will be explained with reference to FIGS. 5 and 9-14. A ring-on-disk test and a reciprocating sliding test as a friction test being operated as the confirmation experiment will hereunder be explained.

According to the ring-on-disk test (in accordance with a thrust-cylinder-type test method), a test piece of a practical example 1 of the aforementioned embodiment is manufactured. The test piece is made of aluminum alloy and includes a crosshatched groove that has 30 degrees of the crosshatch angle α, 40 μm of the groove pitch P, 5 μm of the groove depth H, and 12 μm of the groove width W by the manufacturing process that is similar to, or that is the same as the manufacturing method (see FIG. 5) of the groove 1 that is performed at the skirt portion 14 of the aforementioned embodiment.

A test piece (an unprocessed piece) that does not include the crosshatched groove is provided as a comparison example 1 of the practical example 1. A test piece that includes microscopic and irregular protrusions and recessed portions (the depth of each of the recessed portions is approximately 5 μm) at a surface of a skirt portion by a general shot peening process (a SP process) is provided as a comparison example 2.

In a state where the respective test pieces of the practical example 1, of the comparison example 1, and of a comparison example 2 are soaked within a lubricant oil (0W-20 oil) that is maintained at 80 degrees Celsius, the ring member is rotated while being pressed to the respective surfaces of the test pieces. The load is increased by a constant percentage. The load (a limit contact pressure of seizure (Mpa)) per unit area applied to a sliding surface when the seizure occurs is measured. The rotary speed of the ring member is increased by 1.2 meter per second, or 1.2 m per second. The load is increased by 245 newton, or 245 N per 2 minutes. The ring member is mounted with a coefficient of friction measurement device. In a case where the coefficient of friction between the ring member and the test piece measured by the coefficient of friction measurement device exceeds a predetermined value, the seizure is considered to be generated. Thus, the test equipment is set to be stopped.

Figure 9:
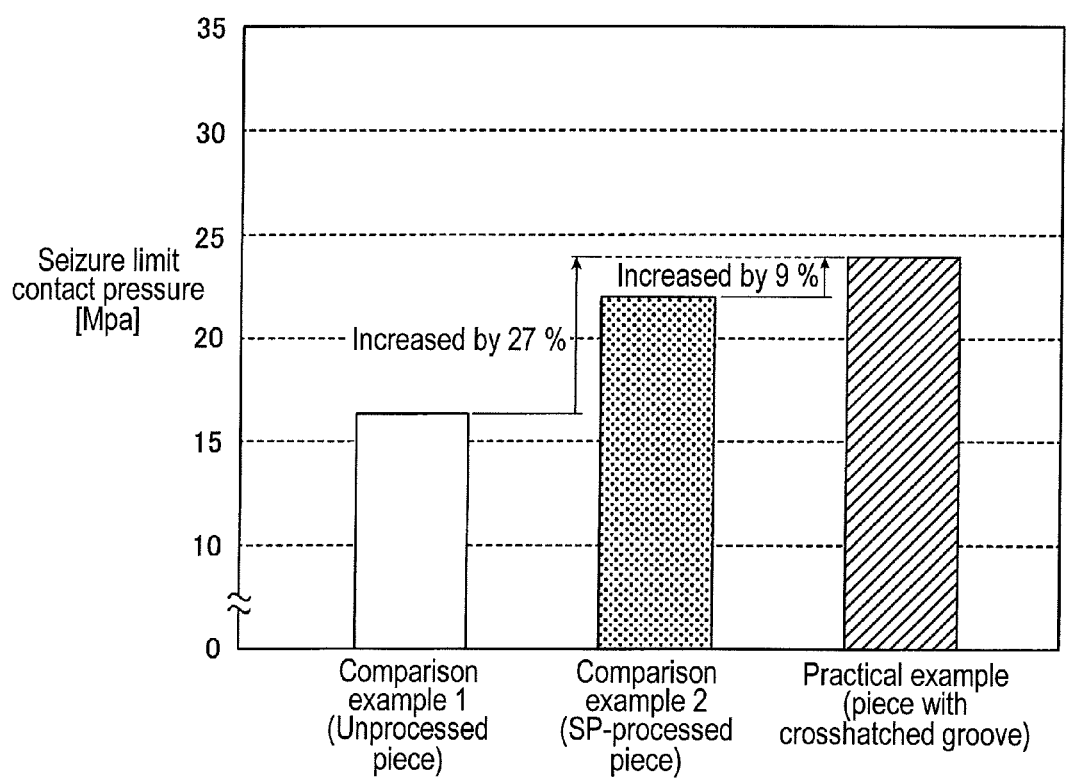
FIG. 9 is a graph illustrating a result of a ring-on disk test performed for confirming an effect of this disclosure.

According to the test result shown in FIG. 9, the limit contact pressure of seizure is increased by 27 percent, or by 27% relative to the test piece (the unprocessed piece) of the comparison example 1, the test piece that does not include the grooves. The limit contact pressure of seizure is increased by 9% relative to the test piece of the comparison example 2, the test piece that includes the micro protrusions and recessed portions at the surface by the SP process.

Next, the test piece that is similar to, or that is the same as the test piece of the comparison example 1, the test piece that does not include the crosshatched groove, and the test piece that is similar to, or that is the same as the test piece of the comparison 2, the test piece in which the shot peening process (the SP process) is performed, are used for the reciprocating sliding test.

The lubricant oil (0W-20 oil) is applied to the respective surfaces of the test pieces of the practical example 1, of the comparison example 1 and of the comparison example 2 at an atmosphere of 150 degrees Celsius. A pillar-shaped pin having a hemispherical distal end portion reciprocatingly slides while being pressed to the surface of the test piece. The number of the reciprocating sliding when the seizure occurs is measured. The load is set at 500 grams, or 500 g. The reciprocating sliding speed is set at 60 per minutes. The sliding stroke is set at 10 millimeter, or 10 mm. The pillar-shaped pin is mounted with the coefficient of friction measurement device. In a case where the coefficient of friction between the ring member and the test piece measured by the coefficient of friction measurement device exceeds the predetermined value, the seizure is considered to occur. Thus, the test equipment is set to be stopped.

Figure 10:
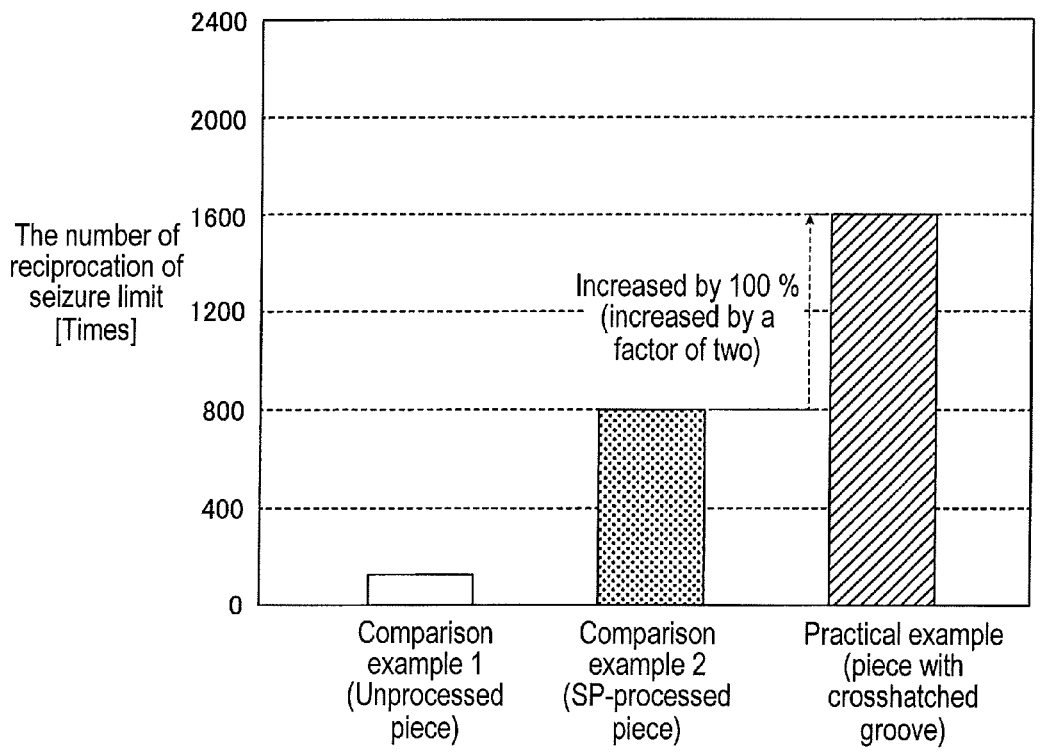
FIG. 10 is a graph illustrating a result of a reciprocating motion test performed for confirming the effect of this disclosure.

The test result in FIG. 10 shows that the number of reciprocation of seizure limit of the test piece of the practical example 1 is increased by 100% (increased by a factor of two) relative to the test piece of the comparison example 2, the test piece including the micro protrusions and recessed portions by the SP process.

The characteristics of the shape, for example, the surface roughness of the respective test pieces of the practical example 1, of the comparison example 1 (the unprocessed piece) and of the comparison example 2, are compared. The surface roughness (Ra: roughness average), the depth of the retained oil (Rvk), and the effective load roughness (Rk) of each of the test pieces before the friction test that is based on Japan Industrial Standard B 0671-2, or on JIS B 0671-2 were measured. Ra value, Rvk value and Rvk/Rk value (the ratio of the depth of the retained oil and the effective load roughness, that is, the depth ratio of the retained oil) of each of the test pieces are compared.

Figure 11:
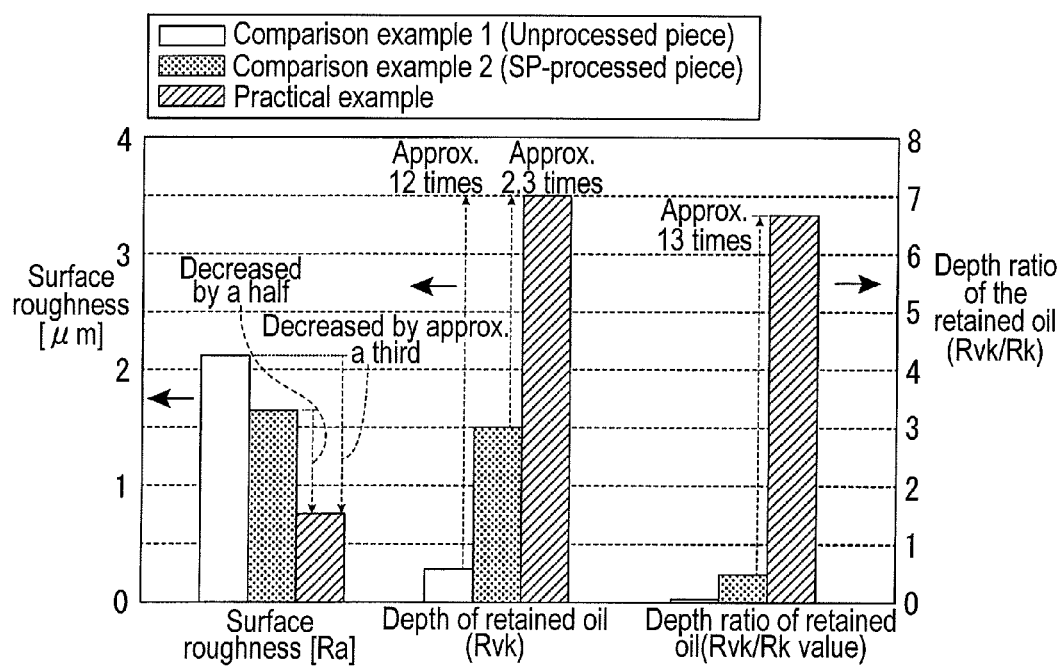
FIG. 11 is a graph illustrating a comparison result of, for example, surface roughness, performed for confirming the effect of this disclosure.

As shown in FIG. 11, according to the surface roughness (bars at left), the test piece of the practical example 1 is decreased by approximately one third relative to the test piece (the unprocessed piece) of the comparison example 1. The test piece of the practical example 1 is decreased by approximately half relative to the test piece of the comparison example 2. That is, it is determined that the surface roughness (Ra) is sufficiently low even if the groove 1 is provided at the skirt portion 14.

Next, according to the depth of the retained oil (bars at center), the test piece of the practical example 1 is increased by approximately 12 times relative to the test piece of the comparison example 1. The test piece of the practical example 1 is increased by approximately 2.3 times relative to the test piece of the comparison example 2. That is, it is determined that the test piece of the practical example 1 includes the largest oil retaining portion than the respective test pieces of the comparison examples 1 and 2.

According to the depth ratio of the retained oil (bars at right), the test piece of the practical example 1 is increased by approximately 13 times relative to the test piece of the comparison example 2. That is, it is determined that the test piece of the practical example 1 includes the depth of the retained oil of approximately 6.7 times (the sufficient oil retaining shape) relative to the effective load roughness.

Based on the test results and the measurement results of the surface shape, the test piece of the practical example 1 is provided with a smooth sliding surface that includes the surface roughness that is relatively less than the respective test pieces of the comparison example 1 and of the comparison example 2. It is determined that the test piece of the practical example 1 includes the sliding surface that has a sufficient depth for retaining the oil.

Next, the confirmation experiments 1 to 3 for examining respective optimum ranges of the crosshatch angle α, of the groove pitch P, and of the groove depth H that configure the crosshatched groove will be explained.

A confirmation experiment 1 examining the optimum range of the crosshatch angle α will be explained with reference to FIG. 12. According to the confirmation experiment 1, the test pieces that each includes 40 μm of the groove pitch P, 5 μm of the groove depth H, and 12 μm of the groove width W are provided. The respective crosshatch angles α of the test pieces correspond to 10, 15, 20, 30, 35, 40, 45 and 55 degrees. The reciprocating sliding test that is explained above is performed for each of the test pieces. In a case where the number of reciprocation of seizure limit is set at equal to or greater than 800 times, it is determined that the test piece has the seizure resistance.

Based on the result of the reciprocating sliding test shown in FIG. 12, it is determined that the seizure resistance comes to be at a maximum in a case where the crosshatch angle α corresponds to 30 degrees. The threshold value of the number of reciprocation of seizure limit determining whether the test piece has the seizure resistance corresponds to 800 times. It is favorable that the crosshatch angle α is set at the range from equal to or greater than 15 degrees to equal to or less than 35 degrees in order to maintain the sufficient seizure resistance.

Next, a confirmation experiment 2 examining the optimum range of the groove pitch P will be explained with reference to FIG. 13. According to the confirmation experiment 2, the test pieces that each includes 30 degrees of the crosshatch angle α, 5 μm of the groove depth H, and 12 μm of the groove width W are provided. The respective groove pitches P of the test pieces correspond to 40 μm and 100 μm. The reciprocating sliding test is performed for each of the test pieces. The surface roughness (Ra: roughness average) of each of the test pieces being provided is measured.

Figure 13:
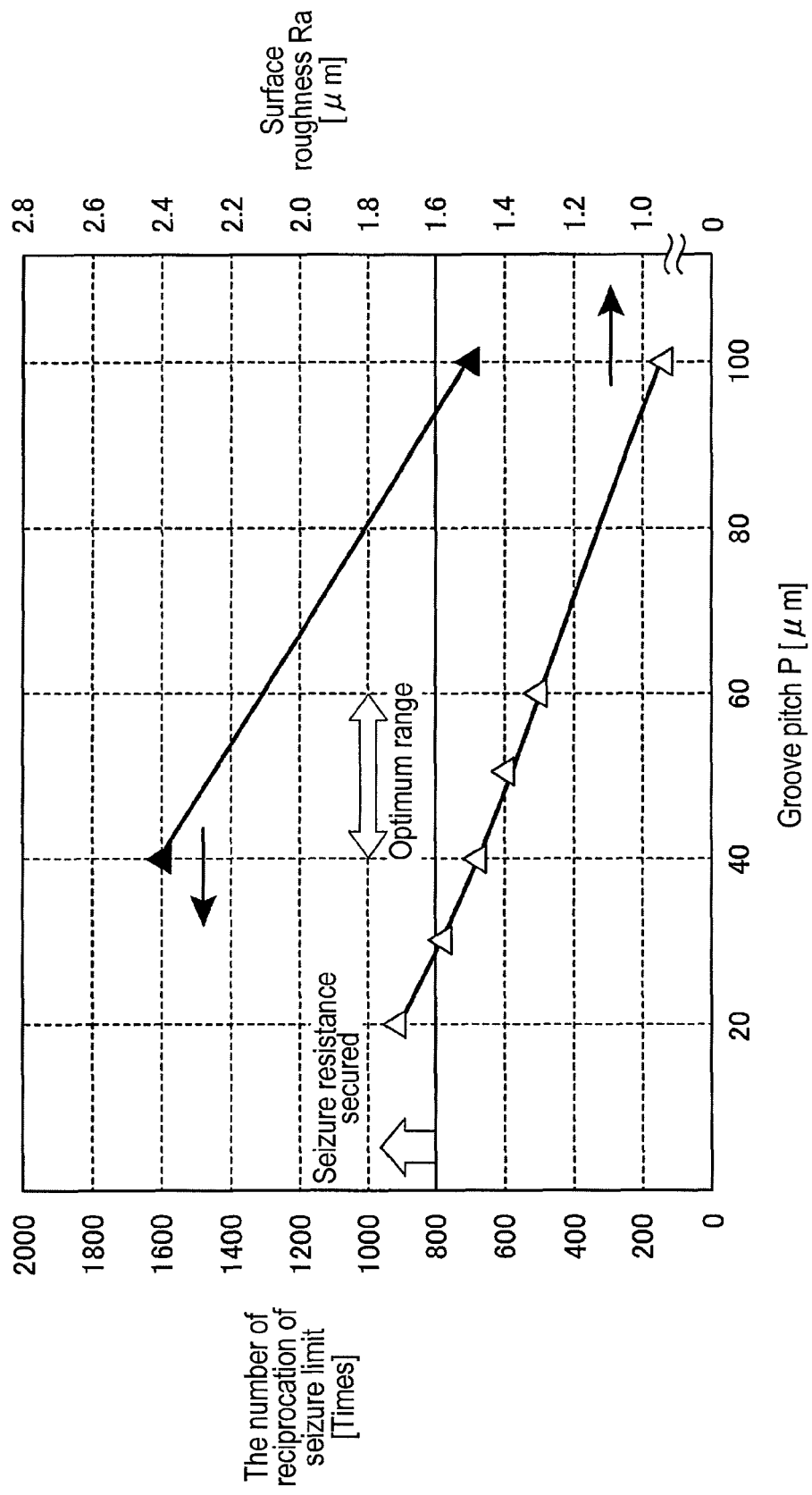
FIG. 13 is a graph illustrating a result of a second confirmation test examining an area of a groove depth of the groove.

Based on the result of the reciprocating sliding test shown in FIG. 13, it is determined that the oil retaining amount of the groove is reduced and the number of reciprocation of seizure limit is reduced (a longitudinal axis of the graph at left) in a case where the groove pitch P is increased, and the surface of the test piece comes to be rough (a longitudinal axis of the graph at right) in a case where the groove pitch P is decreased. It is favorable that the groove pitch P is set equal to or greater than 40 μm and equal to or less than 60 μm.

A confirmation experiment 3 examining the optimum range of the groove depth H will be explained with reference to FIG. 14. According to the confirmation experiment 3, the test pieces that each includes 30 μm of the crosshatch angle α, 40 μm of the groove pitch P, and 12 μm of the groove width W are provided. The respective groove depths H of the test pieces correspond to 3, 5, 7 and 10 μm. The reciprocating sliding test is performed for each of the test pieces. The surface roughness (Ra: roughness average) of each of the test pieces being provided is measured.

Figure 14:
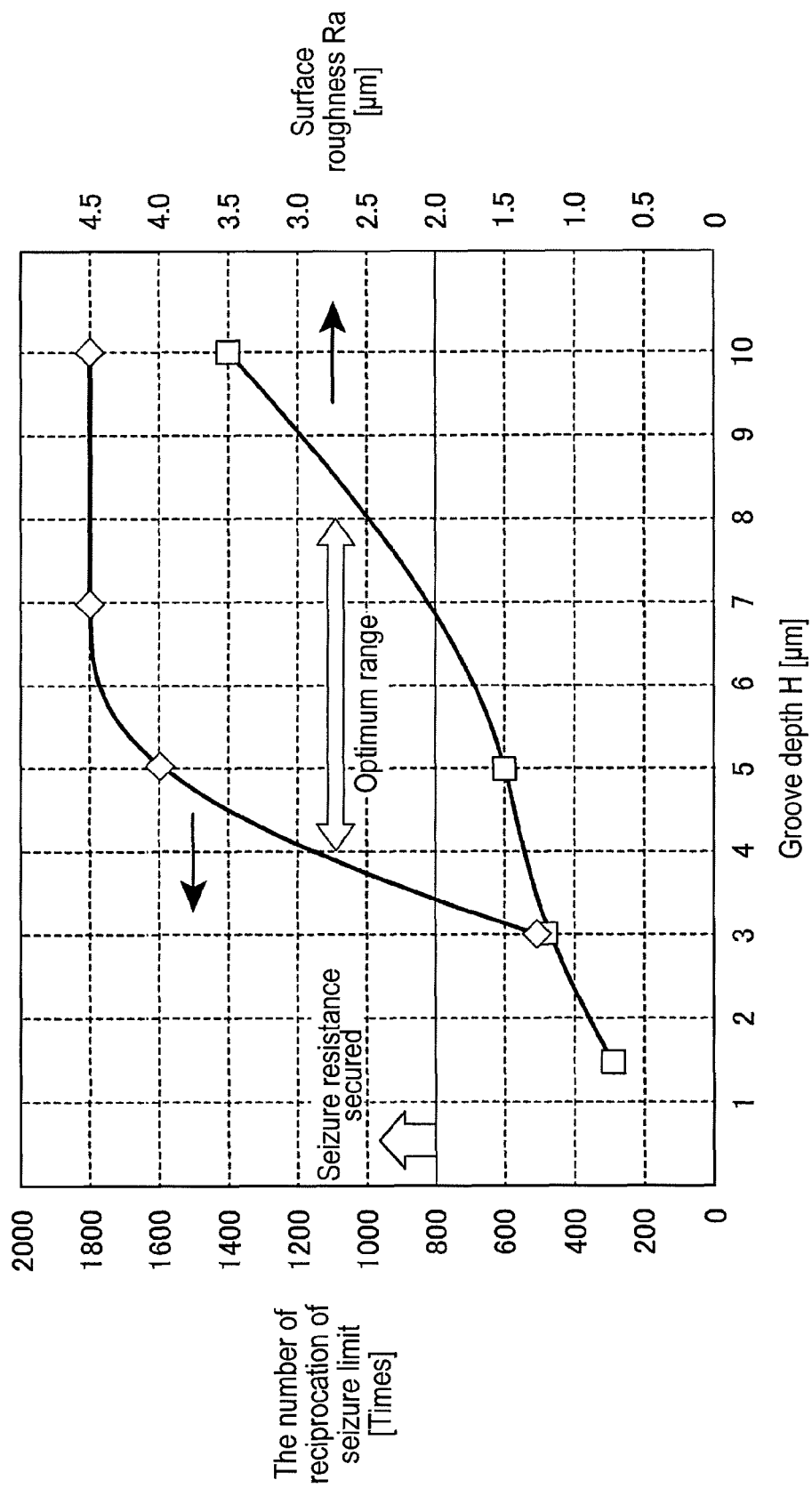
FIG. 14 is a graph illustrating a result of a third confirmation test examining an area of a groove pitch of the groove.

Based on the result of the reciprocating sliding test shown in FIG. 14, it is determined that the oil retaining amount of the groove is increased and the number of reciprocation of seizure limit is increased (the longitudinal axis of a graph at left) in accordance with the increase of the groove depth H, and the respective surfaces of the test pieces come to be rough (the longitudinal axis of the graph at right). It is favorable that the groove depth H is set equal to or greater than 4 μm and equal to or less than 8 μm in order to secure the sufficient seizure resistance.

Based on the results, it is determined that the oil retaining performance can be enhanced by having the crosshatched groove at the sliding surface comparing to a case where the groove is not included (the comparison example 1) and to a case where the groove is provided by the SP process (the comparison example 2). In this case, by setting the crosshatch angle α of the groove at the range from equal to or greater than 15 degrees to equal to or less than 35 degrees, the groove pitch P at the range from equal to or greater than 40 μm to equal to or less than 60 μm, and the groove depth H at a range from equal to or greater than 4 μm to equal to or less than 8 μm, it is confirmed that the sliding surface includes the sufficient seizure resistance because the oil retaining performance is maintained without deteriorating the smoothness of a base material (the sliding surface).

According to the first and second modified examples of the first embodiment and the second embodiment, the disclosure is applied to the piston 10 that is used for the engine 100 of the automobile. Alternatively, this disclosure is applied to a piston that is used for an internal combustion engine for equipment, for example, internal combustion engines for ships and vessels.

According to the second embodiment, the crosshatched groove 1 and the crosshatched groove 2 are provided at the surface 14a of the skirt portion 14 and at the inner circumferential surface 13a of the piston pin hole 13, respectively. Alternatively, the piston main body 11 can be configured by including only the crosshatched groove 2 at the inner circumferential surface 13a.

According to the second modified example of the first embodiment, the crosshatch angle α of the area A is similar to, or is the same as the crosshatch angle α of the area B. Alternatively, the crosshatch angle α of the groove 1 may be different in accordance with the sliding area (for example, the area A and the area B) relative to the inner surface of the cylinder in order to further maintain the oil retaining performance.

According to the first embodiment, the first and second modified examples of the first embodiment, and the second embodiment, the resin-made covering layer 15 (16) is formed on the surface 14a of the skirt portion 14. Alternatively, the piston main body 11 may be provided without including the covering layer 15 (16).

According to the aforementioned embodiment, the piston (10, 70, 80, 90) for the internal combustion engine (the engine 100) includes the piston main body (11) for the internal combustion engine (the engine 100), and the crosshatched groove (1, 2) being formed on the surface (13a, 14a) of the piston main body (11). The crosshatched groove (1, 2) includes the crosshatch angle (α, β) that corresponds to the crossing angle of lines that configure the crosshatch, the crosshatch angle (α, β) that is set at the range from equal to or greater than 15 degrees to equal to or less than 35 degrees.

According to the aforementioned construction, because the crosshatched groove 1, 2 having the cross hatch angle α, β that includes the range from equal to or greater than 15 degrees to equal to or less than 35 degrees is provided, the oil (the lubricant oil) is easily retained within the crosshatched groove 1, 2 that are crossed with each other. That is, unlike a case where crosshatched grooves (plural streaks) independently extend in only one direction, the oil supplied to the piston main body 11 that performs the reciprocating motion can be retained within the crosshatched groove 1, 2 for a longer time, compared to the case where the crosshatched grooves independently extend in only one direction. This point is confirmed with an experiment performed in order to confirm the effects and advantages of this disclosure. As a result, because the sliding portion includes the sufficient oil retaining performance, the seizure resistance of the piston main body 11 can be secured.

According to the aforementioned embodiment, the crosshatched groove (1, 2) includes the pitch (P) that corresponds to equal to or greater than 40 micrometer and equal to or less than 60 micrometer.

According to the aforementioned construction, the surface roughness of the piston main body 11 can be reduced comparing to a case where the groove pitch P is less than 40 μm. Comparing to a case where the groove pitch P is greater than 60 μm, the smooth surface area other than a position where the groove 1, 2 is provided is inhibited from increasing excessively. As a result, the smoothness of the surface 13a, 14a (the sliding portion) of the piston main body 11 and the oil retaining performance can be appropriately maintained.

According to the aforementioned embodiment, the crosshatched groove (1, 2) includes the depth (H) that corresponds to equal to or greater than 4 micrometer and equal to or less than 8 micrometer.

Because the surface roughness of the piston main body 11 is reduced in a case where the groove depth H corresponds to 4 μm, the oil retaining performance is reduced. However, according to the aforementioned construction, the oil retaining performance is inhibited from being reduced. In a case where the groove depth H corresponds to greater than 8 μm, because the surface roughness is excessively increased, the cutting of the oil film at the smooth surface 13b, 14b that is positioned other than the position where the groove 1, 2 is provided easily occurs. However, according to the aforementioned construction, the oil film can be inhibited from being cut. As a result, the smoothness of the surface 13a, 14a of the piston main body 11 (the sliding portion) and the oil retaining performance can be appropriately maintained.

According to the aforementioned embodiment, the piston main body (11) includes the piston skirt portion (14). The crosshatched groove (1, 2) being formed on the surface (14a) of the piston skirt portion (14) is set within the range of the crosshatch angle (α) with respect to the direction orthogonal to the sliding direction (Z) of the piston skirt portion (14).

According to the aforementioned construction, unlike a case where the groove 1 is inclined in the sliding direction (the Z direction) of the skirt portion 14, the oil supplied to the piston main body 11 resulted from an inertial force of the reciprocating motion is effectively inhibited from moving within the groove 1 and from being immediately discharged from the end portion of the skirt portion 14. As a result, because the skirt portion 14 includes the sufficient oil retaining performance, the seizure resistance of the piston main body 11 can be secured.

According to the aforementioned embodiment, the piston (10, 80, 90) for the internal combustion engine (the engine 100) further includes the crosshatched covering layer (15) being made of resin, the crosshatched covering layer (15) being formed so as to cover the surface (14a) of the piston skirt portion (14) in a state where the shape of the crosshatched groove (1) is incorporated into the shape of the crosshatched covering layer (15).

According to the aforementioned construction, the oil can be retained at the surface 14a of the crosshatched covering layer 15 into which the crosshatched groove 1 is incorporated. Thus, because the skirt portion 14 is covered with the resin-made crosshatched covering layer 15, the seizure is prevented and the friction is reduced. In addition, because the surface 14a of the crosshatched covering layer 15 into which the crosshatched groove 1 is incorporated includes the sufficient oil retaining performance, the friction is further reduced.

According to the aforementioned embodiment, the piston (70, 80, 90) for the internal combustion engine (100) further includes the flat-surface covering layer (16) being made of resin, the flat-surface covering layer (16) including the outermost surface (16a) being formed in the flat surface, the flat-surface covering layer (16) being formed so as to be embedded in and cover the crosshatched groove (1) of the surface (14a) of the piston skirt portion (14).

According to the aforementioned construction, because the skirt portion 14 is covered with the resin-made flat-surface covering layer 16, the seizure prevention effect and the friction reduction effect of the piston main body 11 are originally obtained.

According to the aforementioned embodiment, the piston main body (11) includes the smooth surface (13b, 14b) that is provided at the position other than the position where the crosshatched groove (1, 2) is provided, the smooth surface (13b, 14b) including the surface roughness that corresponds to equal to or less than 0.2 micrometer.

According to the aforementioned manufacturing method, the crosshatched groove 1, 2 is easily formed on the surface 13a, 14a of the piston main body 11 by laser processing. That is, unlike a case where protrusions and recessed portions are formed on the surface 13a, 14a of the piston main body 11 by the general shot peening process (the SP process), the cleaning of the fine grains (media) that are used for the SP processing is not required. In addition, portions other than the area having the groove 1, 2 do not have to be masked. Thus, the crosshatched groove 1, 2 having the oil retaining performance is easily formed by the simplified manufacturing process. Accordingly, the piston for the engine 100 that sufficiently secures the seizure resistance can be easily manufactured.

According to the aforementioned embodiment, the piston main body (11) includes the piston pin hole (13) being configured to be inserted with the piston pin (30) to be connected to the connecting rod (40). The crosshatched groove (2) being formed on the inner circumferential surface (13a) of the piston pin hole (13) is set within the range of the crosshatch angle (β) with respect to the sliding direction (Y) of the inner circumferential surface (13a) of the piston pin hole (13) relative to the piston pin (30).

According to the aforementioned embodiment, the manufacturing method of the piston (10, 70, 80, 90) for the internal combustion engine (the engine 100) includes the forming process forming the crosshatched groove (1, 2) on the surface (13a, 14a) of the piston main body (11) for the internal combustion engine (the engine 100) by the laser processing, the crosshatched groove (1, 2) including the crosshatch angle (α, β) that corresponds to the crossing angle of the lines that configure the crosshatch, the crosshatch angle (α, β) having the range from equal to or greater than 15 degrees to equal to or less than 35 degrees.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A piston for an internal combustion engine, comprising:
   a piston main body for the internal combustion engine; and
   a crosshatched groove being formed on a surface of the piston main body; wherein
   the crosshatched groove includes a crosshatch angle that corresponds to a crossing angle of lines that configure a crosshatch, the crosshatch angle that is set at a range from equal to or greater than 15 degrees to equal to or less than 35 degrees.

2. The piston for the internal combustion engine according to claim 1, wherein the crosshatched groove includes a pitch that corresponds to equal to or greater than 40 micrometer and equal to or less than 60 micrometer.

3. The piston for the internal combustion engine according to claim 1, wherein the crosshatched groove includes a depth that corresponds to equal to or greater than 4 micrometer and equal to or less than 8 micrometer.

4. The piston for the internal combustion engine according to claim 1, wherein
   the piston main body includes a piston skirt portion; and
   the crosshatched groove being formed on the surface of the piston skirt portion is set within the range of the crosshatch angle with respect to a direction orthogonal to a sliding direction of the piston skirt portion.

5. The piston for the internal combustion engine according to claim 4, further comprising
   a crosshatched covering layer being made of resin, the crosshatched covering layer being formed so as to cover the surface of the piston skirt portion in a state where a shape of the crosshatched groove is incorporated into a shape of the crosshatched covering layer.

6. The piston for the internal combustion engine according to claim 4, further comprising
   a flat-surface covering layer being made of resin, the flat-surface covering layer including an outermost surface being formed in a flat surface, the flat-surface covering layer being formed so as to be embedded in and cover the crosshatched groove of the surface of the piston skirt portion.

7. The piston for the internal combustion engine according to claim 1, wherein the piston main body includes a smooth surface that is provided at a position other than a position where the crosshatched groove is provided, the smooth surface including a surface roughness that corresponds to equal to or less than 0.2 micrometer.

8. The piston for the internal combustion engine according to claim 1, wherein
the piston main body includes a piston pin hole being configured to be inserted with a piston pin to be connected to a connecting rod; and
the crosshatched groove being formed on an inner circumferential surface of the piston pin hole is set within the range of the crosshatch angle with respect to a sliding direction of the inner circumferential surface of the piston pin hole relative to the piston pin.

9. A manufacturing method of a piston for an internal combustion engine comprising:
a forming process forming a crosshatched groove on a surface of a piston main body for the internal combustion engine by a laser processing, the crosshatched groove including a crosshatch angle that corresponds to a crossing angle of lines that configure a crosshatch, the crosshatch angle having a range from equal to or greater than 15 degrees to equal to or less than 35 degrees.

* * * * *